April 8, 1952   J. E. COCHRAN   2,592,394
REFRIGERATOR DEFROST PRODUCT DISPOSAL SYSTEM
Filed July 28, 1950   6 Sheets-Sheet 1

INVENTOR.
JOHN E. COCHRAN
BY
ATTORNEYS

INVENTOR.
JOHN E. COCHRAN

April 8, 1952          J. E. COCHRAN          2,592,394

REFRIGERATOR DEFROST PRODUCT DISPOSAL SYSTEM

Filed July 28, 1950          6 Sheets-Sheet 3

INVENTOR.
JOHN E. COCHRAN
BY
ATTORNEYS

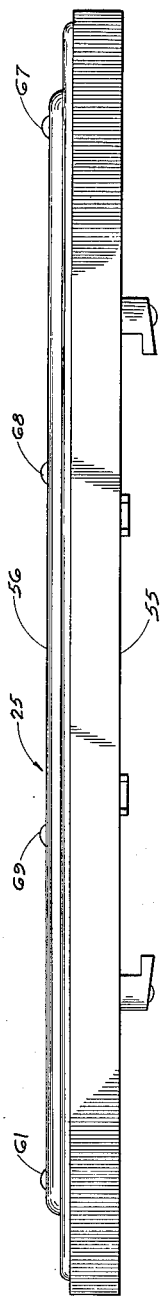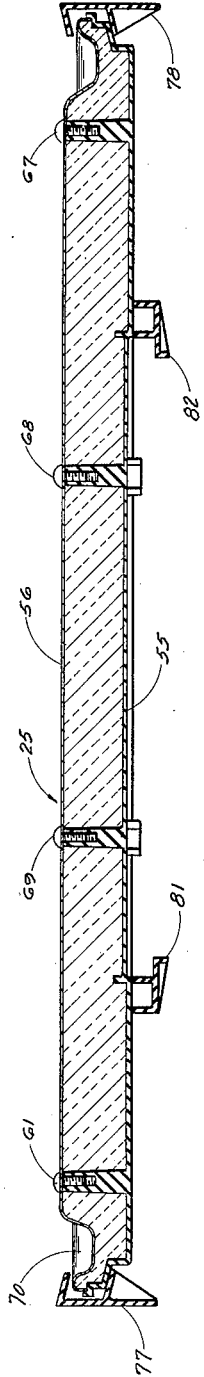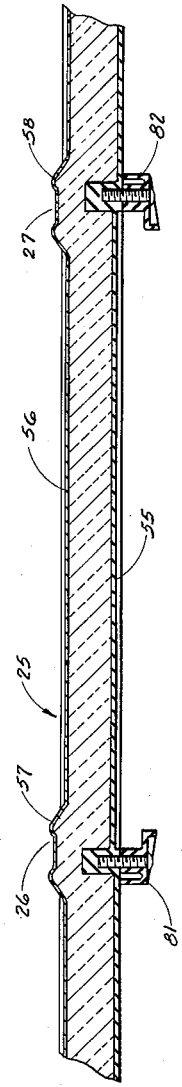

April 8, 1952 J. E. COCHRAN 2,592,394
REFRIGERATOR DEFROST PRODUCT DISPOSAL SYSTEM
Filed July 28, 1950 6 Sheets-Sheet 5

INVENTOR.
JOHN E. COCHRAN
BY
ATTORNEYS

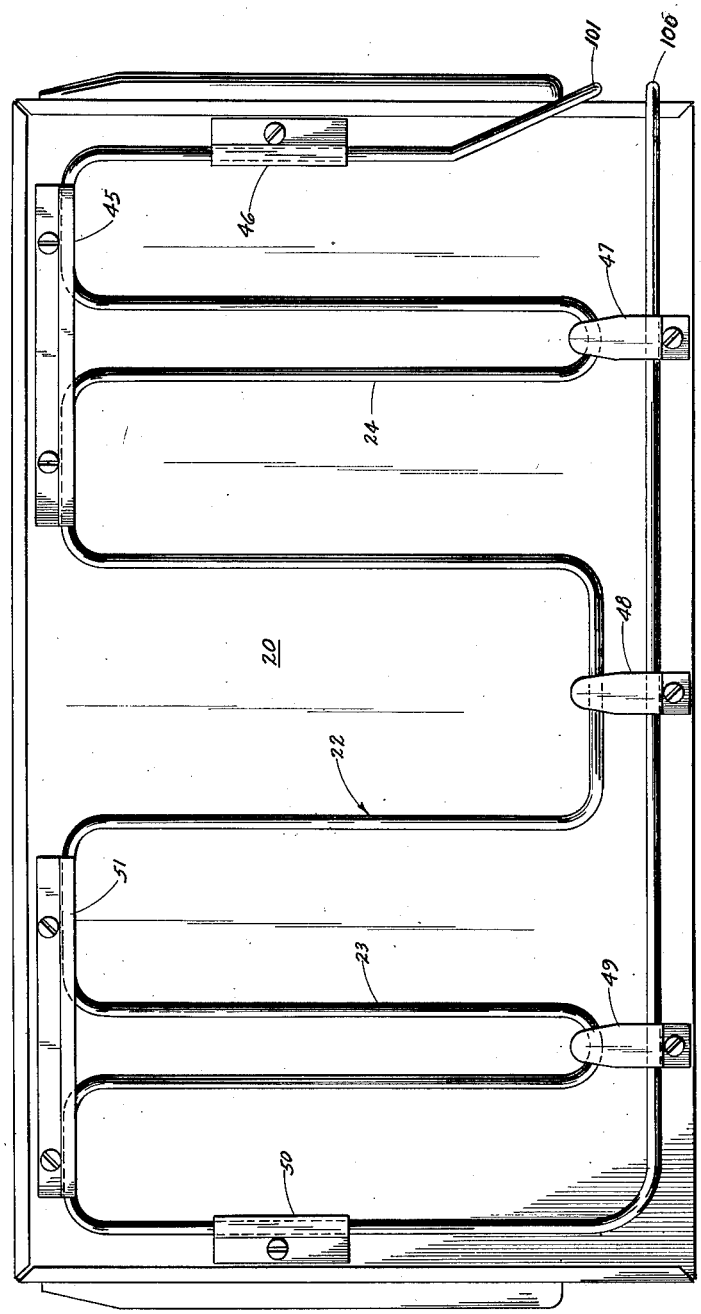

Patented Apr. 8, 1952

2,592,394

UNITED STATES PATENT OFFICE 2,592,394

REFRIGERATOR DEFROST PRODUCT DISPOSAL SYSTEM

John E. Cochran, Cincinnati, Ohio, assignor to Avco Manufacturing Corporation, Cincinnati, Ohio, a corporation of Delaware Application July 28, 1950, Serial No. 176,352

11 Claims. (Cl. 62—103)

The present invention relates generally to defrosting systems for household refrigerators and specifically to a novel system for collecting and disposing of the products of defrosting without undesired accumulation of ice.

By way of introduction, the background art which poses the problem solved by the present invention is briefly narrated. In the typical domestic refrigerator, the cabinet interior is cooled by air circulation through convection currents traveling between the relatively warm and cold portions of the refrigerated space. The warm air commonly carries suspended moisture which is deposited upon the exterior surfaces of the evaporator in the form of frost. In areas of high humidity and ambient temperatures, this condition is aggravated. The effect of this coating of frost is very adverse. The frost acts as an undesired insulating agent between the evaporator and the circulating air and impairs absorption of heat by the evaporator. When this accumulation of frost becomes large, it is customarily removed by turning off the compressor and stopping the refrigeration process for several hours, for instance overnight, thereby permitting the frost to slowly melt, or by accelerating the melting of the frost by placing pans of hot water within the refrigerator evaporator. This procedure is time-consuming and annoying to the housewife since it interrupts the refrigerating process for extended periods of time, frequently causing food to spoil. Additionally, this procedure imposes on the housewife the necessity of performing a number of manual operations, such as opening the door, removing food from the refrigerator, and turning off the compressor motor control switch. This is universally regarded as a nuisance-factor seriously impairing the enjoyment of automatic domestic refrigeration.

Various attempts have been made to provide an automatic defrosting system. One expedient involves a time-clock, which automatically interrupts the refrigeration process for a long period of time, permitting a gradual warming of the refrigerator and contents until the frost is melted. This expedient also tends to spoil the food and has not been regarded as an adequate solution to the problem of automatic defrosting.

Another proposal has been to reverse the flow of refrigerant so that hot gas or liquid from the compressor is led into the normally cold evaporator. This likewise requires considerable time for the hot compressed gas to work back through the system anad results in the deterioration of frozen food within the evaporator. It additionally requires valves in the sealed refrigerant system, is expensive and otherwise unsatisfactory.

The most sound approach is premised on the use of electrical heating elements, disposed adjacent the evaporator. The frost is rapidly melted by the heat-dissipating resistance losses accompanying the flow of electric current in a conductor.

This system comprises time-clock and thermostatically controlled circuit elements which periodically, say daily, automatically arrest the compressor anad connect the heating elements to a source of electrical energy, so that the heat dissipating elements rapidly melt the frost, the refrigeration process being interrupted only for an interval of short duration. This interval is short and since the heating effect is confined to the exterior surfaces of the evaporator, the temperature rise of the usual stored or frozen foods is slight and they are not adversely affected by the defrosting operation. At the end of the defrosting operation, the heating elements are automatically uncoupled from the energy source and the compressor is again started, normal refrigeration being resumed. An advanced system of this type, with fool-proof thermostatic and time-clock controls, is shown in the copending patent application of Benjamin D. Thomas, entitled "Defroster Apparatus," filed in the United States Patent Office on June 20, 1950, Serial No. 169,195, and assigned to the same assignee as the present application and invention. The present invention is primarily but not restrictively intended to be used in conjunction with this advanced short-duty-cycle defrosting system, and reference is accordingly made to that application for a detailed description thereof.

The trend in domestic refrigeration has favored the type of refrigerator which comprises an upper freezing compartment and a lower food storage compartment, the former being maintained at sub-freezing temperatures on the order of 10 degrees F., or less, and the latter being maintained at temperatures on the order of 40 degrees F. The top, bottom, rear and sides of the upper freezing compartment are conventionally defined by the walls of a horizontally disposed evaporator. The main inner liner of the refrigerator has integral portions defining the bottom and side boundaries of the lower compartment, which opens out in front to the main refrigerator door. The freezing compartment is closed by a separate relatively small evaporator door, customarily swingably mounted on a horizontal axis, these features being shown in the copending patent application of Alfred E. Nave, entitled "Evaporator Door," Serial No. 84,945, filed in the United States Patent Office on April 1, 1949, and assigned to the same assignee as the present application and invention. This application became Patent No. 2,571,600 on October 16, 1951, and reference is made to that application for a detailed description of such features, since they are not a part of the present invention.

By reason of the relatively large capacity evaporator characteristic of the modern low-temperature or frozen food compartment, it is necessary to insulate and separate it from the higher-temperature food storage compartment in order to maintain the requisite temperature differential between the compartments. This is accomplished by a non-heat-conducting baffle which separates the upper and lower compartments and maintains this temperature differential. This baffle is also employed to deflect the products of defrosting to a suitable exhaust or disposal system. Since the horizontal evaporator is maintained at a very low temperature, is relatively large and has a considerable heat-absorbing area, the amount of moisture collected thereon is substantial, even when defrosting occurs before the frost thickness becomes very great. Commercial experience has shown that this prior art baffle construction has a serious disadvantage, when employed with a defroster, in that the deposited moisture collects on the baffle which is very cold, and leaves a mass of ice after each defrosting operation. Since this operation occurs daily, layers of ice successively accumulate until the aggregate mass is very large, with the following consequences: (1) The ice so forming on top of the baffle interferes with the characteristics of the baffle, whereby the desired temperature differential between the two compartments is interferred with; (2) The ice adheres to the baffle mountings and prevents removal thereof; (3) The ice prevents an unsightly appearance and interferes with the desired air circulation around or through it; (4) The ice interferes with the removal of the defrost products and causes them to run into the food storage compartment. In order to avoid these consequences the refrigerator must periodically be non-automatically defrosted in accordance with the objectionable primitive practice, so that in last analysis even the quick-heating defrosters heretofore used are not satisfactory.

The ice-forming characteristic of the prior-art baffle troubled the art, annoyed the consumer, and constituted what was considered a major defect in, and an obstacle to general adoption of, automatic defrosting devices. The invention is directed primarily to the solution of this problem and the illustrative embodiment herein shown has been experimentally and practically found to be a complete solution.

Accordingly, the fundamental objects of the invention are:

(1) To provide a refrigerator construction including a short-duty-cycle defrosting device in which the defrost products are so exhausted and disposed of that they do not cause redeposits of ice in the interior of the refrigerator;

(2) To provide a refrigerator-defroster device combination in which moisture defrosted from the evaporator is deflected toward an exhaust zone by a moisture collector without redeposition of ice on the collector;

(3) To provide such a refrigerator of the type including an upper freezing compartment defined by a horizontal evaporator, a lower food storage compartment, a removable baffle for generally separating the two compartments, a defroster device for removing frost from the evaporator, and means for preventing ice-formation on the baffle;

(4) To provide, in a refrigerator of the type including a frost-accumulating evaporator, and a heat insulating and moisture-collecting baffle, a defroster heating element in heat-transfer relationship to both evaporator and baffle;

(5) To provide, on the baffle, a heat-conducting top surface having upwardly projecting grooves in thermal engagement with integral runners included in a defroster heating element mounted below and in contact with the evaporator;

(6) To provide front-to-back runners formed as skid rails in contact with said grooves, whereby the baffle, slidably mounted for retraction from or insertion in the refrigerator, is easily removed or installed;

(7) To provide, at the exhaust zone of the baffle, a pair of selectively plugged openings, one registering with a container mounted beneath the baffle, whereby the container may be used for non-automatic defrosting, the other registering with a drain spout leading to the exterior of the refrigerated space, whereby defrost products may be deposited exteriorally during automatic defrosting operations:

(8) To provide a container for the automatically defrosted moisture, so located in the machinery compartment as to be efficiently subject to hot air currents producing rapid evaporation and dissipation thereof, whereby defrost products are automatically disposed of between defrosting operations;

(9) Broadly, to heat at least a part of the moisture-disposal system during the defrosting operation;

(10) To provide an efficient baffle construction which responds to action of the heater element to inhibit ice formation and at the same time maintains the desired temperature differential between food storage and freezing compartments;

(11) To provide a heating element construction which prevents ice formation on the baffle.

Auxiliary objectives are to carry out the novel directive concepts of the invention economically and with maximum convenience to the user. All of these objects are directed to the manufacture and sale of a commercially successful refrigerator improvement of pioneer character.

For a better understanding of the invention, together with other and further objects, advantages and capabilities thereof, reference is made to the accompanying drawings, in which there is disclosed a preferred illustrative embodiment of defrost products disposal system in accordance with the present invention.

Particular attention is first directed to the horizontally disposed evaporator 20 and evaporator door 19 (Figs. 1, 2, 3 and 10), the lower food storage compartment 21 (Figs. 1 and 3), the heating element 22 of the defrosting device (Fig. 13), the integral skid rails 23, 24 (Figs. 1, 2, 3, 10, 13) included in the heating element, the baffle 25 (Figs. 1, 2, 3, details in Figs. 4–9), the grooves 26, 27 formed on the top surface of the baffle (Figs. 4 and 9), the discharge openings 29 and 28 (Fig.

4), in the baffle and leading to an optional meat storage or drip tray 30 (Figs. 1, 3) and a drain spout 31 (Figs. 3, 11, 12), respectively, a drain pipe system 32 (Fig. 3), and an evaporating reservoir 33 (Figs. 1, 3). As the description of the invention proceeds, it will become apparent that these elements or equivalents are the focal points of the discussion.

Figure 3:
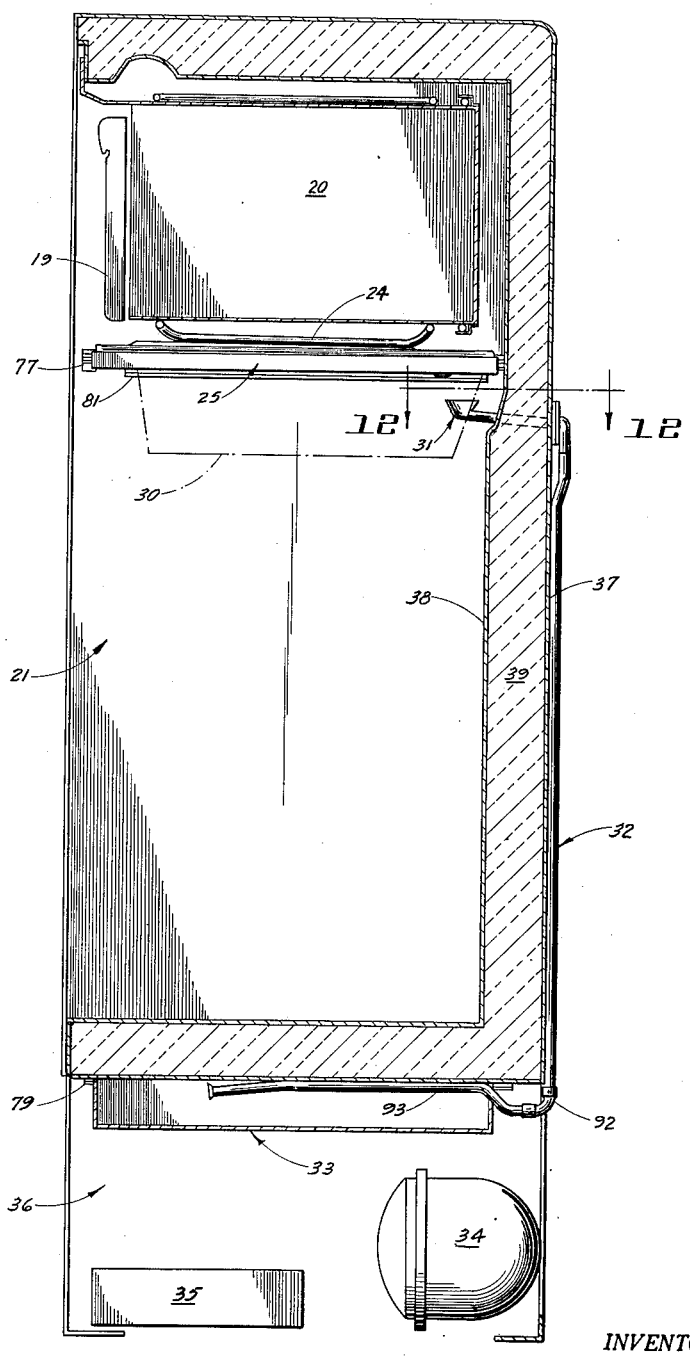
Fig. 3 is an elevational sectional view of the Fig. 1 refrigerator, with the main door and the shelves removed, this view being taken along section line 3—3 of Fig. 1 and looking in the direction of the arrows.
Figure 4:
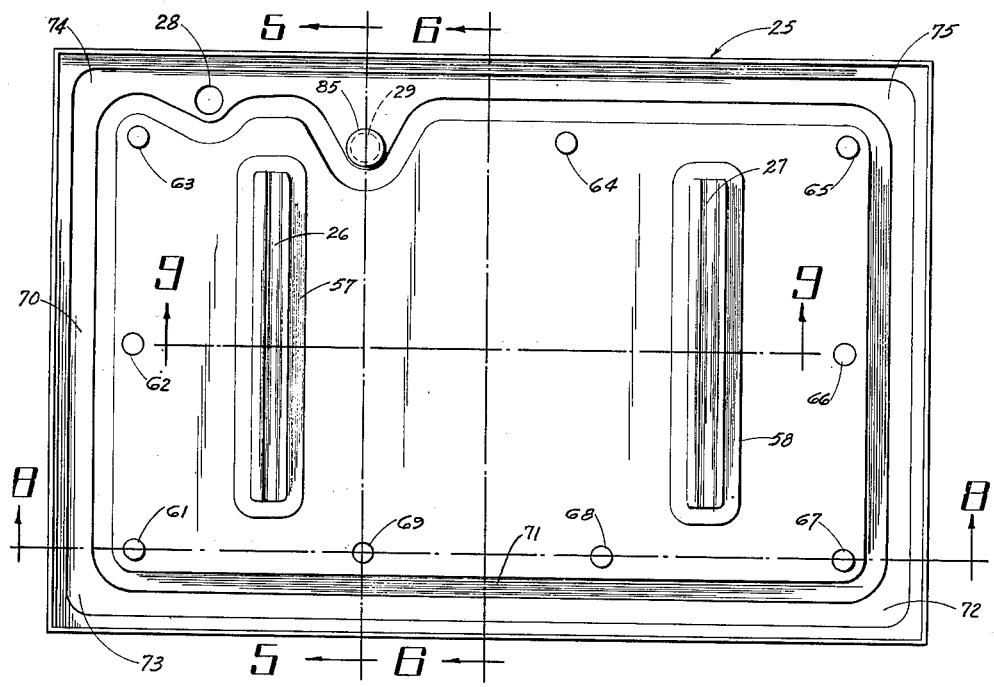
Fig. 4 is a top plan view of the baffle per se, for separating the freezing and food storage compartments.
Figure 10:
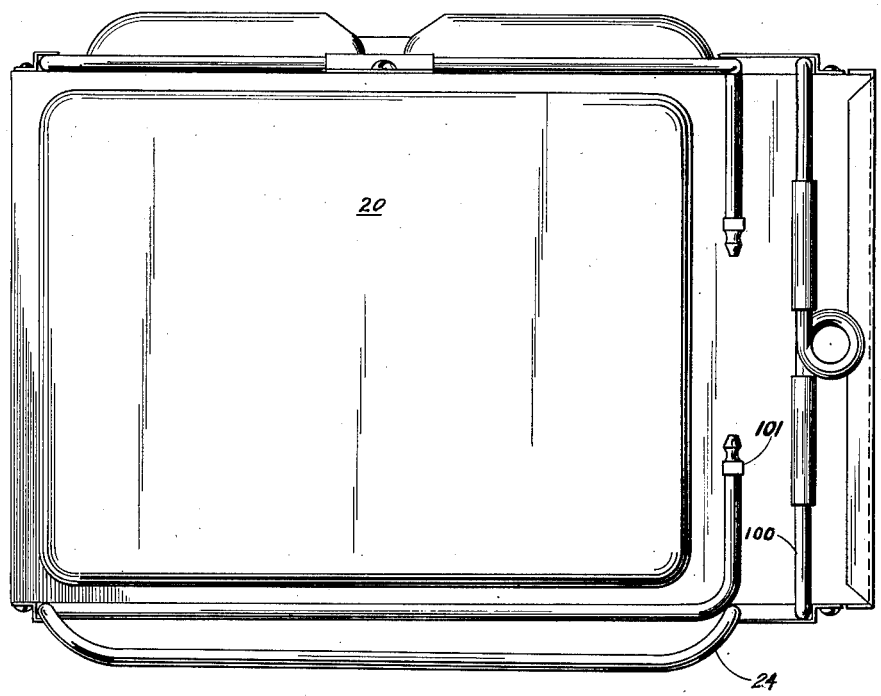
Figure 11:
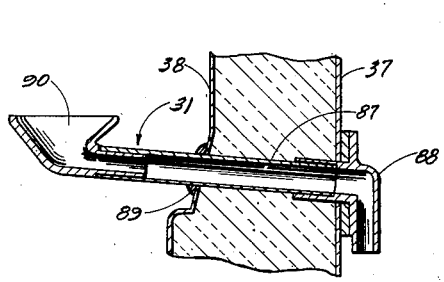
Figure 12:
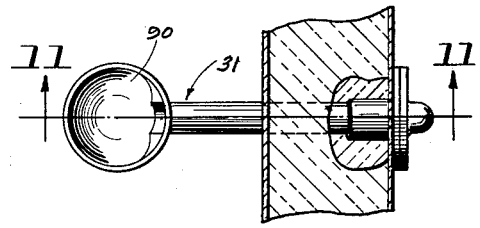

Figs. 5, 6, 8 and 9 are cross-sectional views of the baffle element, taken respectively along the section lines 5—5, 6—6, 8—8 and 9—9 of Fig. 4, in each case looking in the direction of the appropriately numbered arrows;

Fig. 7 is a front elevational view of the baffle per se;

Fig. 10 is a right-side elevational view of the evaporator, showing one of the integral skid rails of the heating element;

Fig. 11 is a sectional view of the drain spout taken on line 11—11 of Fig. 12;

Fig. 12 is a top view of the drain spout, as seen by an observer looking in the direction of the arrows 12—12 of Fig. 3; and Fig. 13 is a bottom view of the evaporator showing the heating element in place.

The invention is applicable to refrigeration systems of various types, but in the illustrative embodiment it is shown as applied to a system in which a refrigerant compressor 34 (Fig. 3) preferably sealed in a dome supplies a suitable refrigerant gas such as dichlorodifluoromethane to a condenser 35, wherein it is liquefied and supplied through suitable flow control means (not shown) to an evaporator 20. The liquid refrigerant evaporates and absorbs heat in conventional fashion from the confined refrigerated space, and the heat laden refrigerant vapor is returned through a suitable suction tube (not shown) into a low pressure space within or adjacent the compressor. This system is not shown in detail since it is conventional and is well understood in the art.

Figure 1:
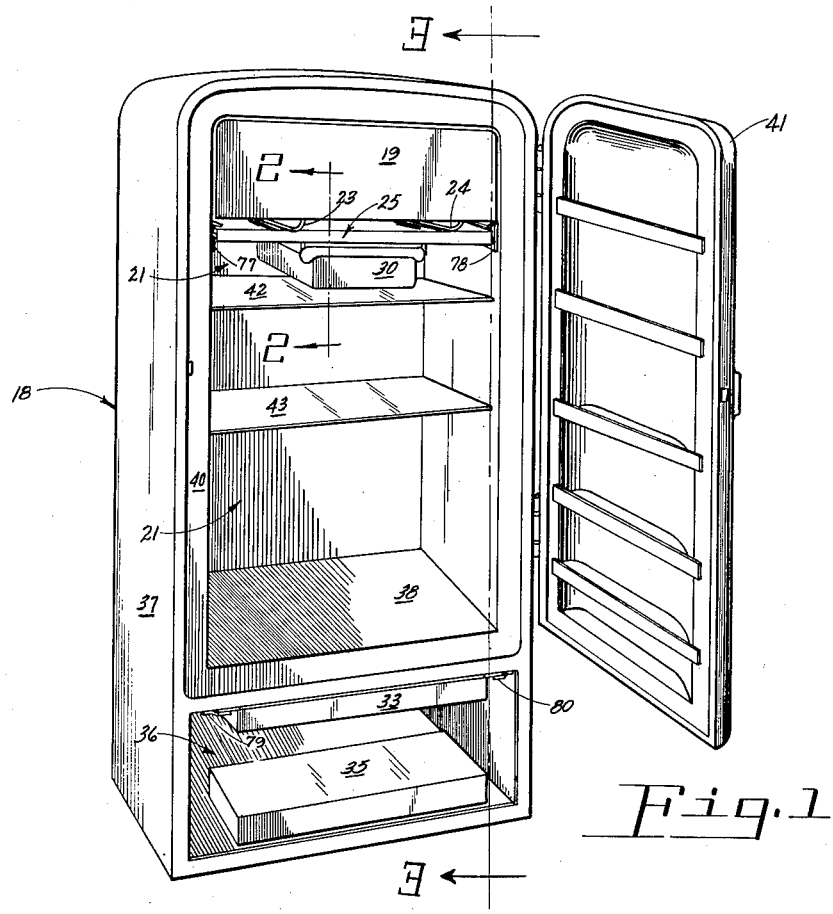
Fig. 1 is a front perspective view of a domestic refrigerator which is of well-known construction, except in the respects to which attention has been directed and hereinafter pointed out in detail, the door being here shown in open position to reveal the contents.

Referring now specifically to Figs. 1 and 3, there is shown a refrigerator cabinet 18 having a food storage compartment 21 to be maintained at above-freezing temperatures, a door 19 for providing access to a freezing compartment which comprises the interior of evaporator 20, and a machinery compartment 36 positioned below the food storage compartment 21. The walls of the cabinet are formed of an outer metal shell 37 and a spaced inner shell 38, with thermal insulation 39 disposed in the space between the shells.

A breaker strip 40 extends between the inner and outer shells and lies in the front plane of the cabinet to provide a flat front. The evaporator 20 serves to cool compartment 21 and to provide freezing temperatures in the freezing compartment which it encompasses. The details of the main door 41 are not pertinent to the present invention and are not herein discussed. Suitable shelves such as those numbered 42, 43 and food containers (not shown) may be placed within the food storage compartment 21 in desired fashion, such disposition also not being pertinent to the present invention.

Particular attention is now directed to the baffle 25 and the defroster heating element 22 (Figs. 1, 2, 3 and 13). As indicated above, the evaporator 20 accumulates frost during normal operation. This evaporator is large and the volume of accumulated frost is substantial. In the above-mentioned copending patent application of Benjamin D. Thomas there is provided a successful defrosting device for melting the frost and causing it to drop from the evaporator. That defrosting device comprises electrical heating elements disposed adjacent the top and bottom of the evaporator, suitably automatically controlled by thermosatic and timing devices so that the heating elements are periodically energized for brief intervals. During each such interval the heating elements generate substantial amounts of heat, and this heat is transferred principally by conduction to the metallic evaporator, melting the frost thereon. That problem of defrosting being successfully solved, the next problem, with which the present invention is concerned, is to more satisfactorily dispose of the defrost products. Heating element 22 is herein shown (Fig. 13), secured to the bottom of the evaporator 20 as by mounting clips 45, 46, 47, 48, 49, 50, and 51.

The operation of the defroster, including element 22, causes water to fall onto baffle 25. In prior-art constructions, some of the water falling onto the baffle or moisture deflecting element, corresponding to number 25, again froze, depositing a layer of ice on the top surface of the baffle. The resultant disadvantages have been discussed above. The problem, broadly stated, is to prevent the formation of ice and frost in the defrost-products disposal system.

The present invention is believed to be broadly based on a perception as to the true nature of the problem, i. e., to prevent the formation of ice in the disposal system. Among the directive concepts of the invention is the provision of a defroster which heats the frosted evaporator, causing the frost to be melted, and also heats the moisture collector and deflector 25, preventing the reformation of ice. Another concept is the provision of a baffle construction such that ice reformation is prevented while the primary baffle function (maintaining a temperature differential between freezing and storage compartments) is preserved.

In accordance with the invention, there is provided the combination of a frost accumulator 20, a moisture collector 25 spaced from the frost accumulator, and a defroster heating element 22 having portions 23, 24 in heat conducting relationship to both accumulator and collector.

The evaporator 20 (Figs. 1, 3, 10, 13) is generally box-like in shape, with its access opening adjacent door 19, located at the top front portion of the cabinet. A sinuous tubular electrical heating element 22, terminating at 100, 101 is mounted on its bottom exterior (Fig. 13). The illustrative element shown has eight runs extending in a front-to-back direction and seven turns, five generally rectangular in shape and two semicircular. All runs and turns closely abut the evaporator exterior with the exception of runs 23 and 24, which have integral depending portions formed as skid rails or runners and projecting downwardly away from the evaporator toward the baffle. These spaced skid rails are parallel, and they constitute means for heating the baffle top surface during the defrosting operation.

Concentrically contained within hollow tubular heat-conductive metallic element 22 is an electrical conductor, suitably electrically insulated, which conductor is encircuited with an electrical energy source during defrosting, whereby the element generates a large amount of heat and melts frost on the evaporator surfaces. Heat is also transferred by the integral runners 23, 24 to the top surface of the baffle 25, preventing ice formation thereon.

Figure 2:
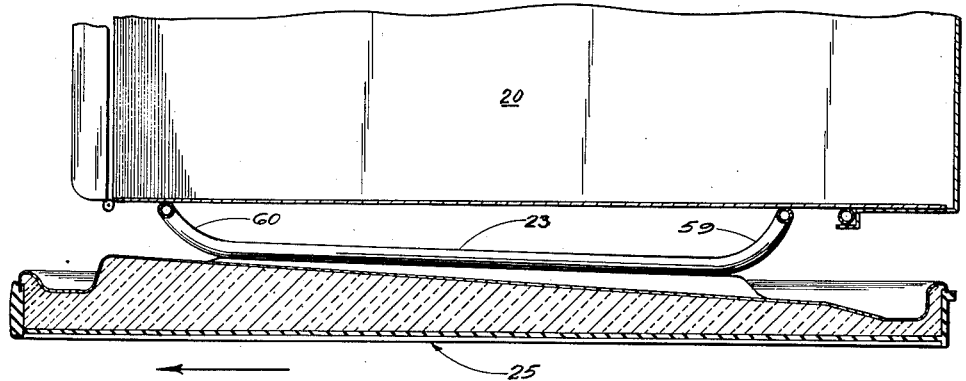
Fig. 2 is an enlarged fragmentary side elevational sectional view showing the evaporator, one of the skid rails of the heating element and the baffle, in their normal operative positions, this view including those three main elements only and being taken on the section line 2—2 of Fig. 1, looking in the direction of the arrows.

Referring now specifically to the baffle 25, it is slidably horizontally mounted on rails 77 and 78 for insertion in or withdrawal from the cabinet. The baffle comprises a main body member 55 and a relatively thin metallic top or cover member 56. The top member is illustratively made of anodized aluminum, and the bottom member of a heat-insulating plastic composition such as polystyrene. The top member is formed with two spaced parallel "swells" or integral projections 57 and 58 on which are formed grooves 26 and 27, the groove spacing from center-to-center being the same as that of the skid rails 23, 24. As best seen in Fig. 2, each groove slopes slightly downwardly and to the rear and the skid rails slope at the same angle, the rear end 59 of each rail (Fig. 2) being lower in level than the front portion 60. These slopes permit quick release of the grooves from the skid rails when the baffle is removed from the cabinet by movement in the direction of the arrow in Fig. 2.

The rails 23, 24 are in thermal contact with grooves 26 and 27, and need not be in actual mechanical contact since water running off the rails will act as a heat transfer medium. A slight clearance is permissible and often desirable providing it is not sufficiently great to break the water film between the two members.

Figure 5:
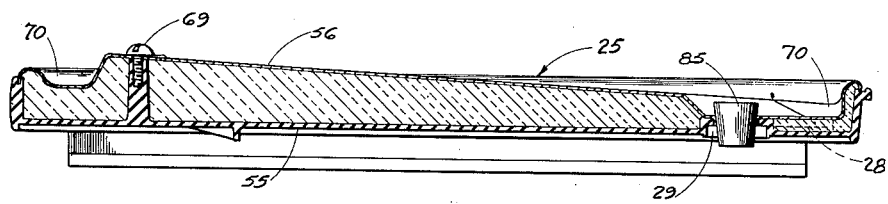
Figure 6:
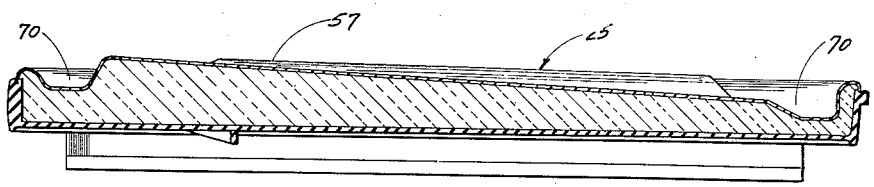

The top surface of the baffle is generally planar and sloping downwardly to the rear, as best shown in Figs. 2, 5 and 6. The upper member 56 is apertured to receive fastening screws 61—69 (Fig. 4) placed near the margins for securing the upper member to the body member 55. Both baffle members are apertured at 28 and 29 to provide moisture-discharge openings. A trough 70 (Figs. 4, 5, 6, 8) is formed near the outer margins of the baffle. This trough extends completely around the baffle, sloping downwardly from a high point 71 to points 72, 73 (Fig. 4), then downwardly from points 72, 73 to points 74, 75, and still downwardly from points 74, 75 to the discharge area of openings 28, 29. Fig. 5 shows trough 70 sloping downwardly from point 74 toward discharge opening 29.

Between the top panel 56 of the baffle and the main baffle body member 55 is sealed suitable insulating material such as glass wool. The baffle herein shown, with the exception of the metallic top panel 56, generally resembles that shown in the patent to John W. Norrish and Alfred E. Nave, No. 2,496,252 dated January 31, 1950, entitled "Refrigerator Cabinet Construction" and assigned to the same assignee as the present invention and application. Reference is made to that application for a detailed description as to a suitable means of mounting the baffle and method for sealing the baffle members together.

The general rearwardly sloping planar top surface of the top member 56 and trough 70, gradually sloping toward the discharge zone, cause moisture to be deflected to the discharge zone.

Since the thin top member 56 is of a metallic-high-heat conductive material, and the body of the baffle below top 56 is non-heat conducting, heat from the rails 23, 24 is rapidly conducted to and distributed over the top surface of the baffle, completely preventing the formation of ice thereon. Air currents between the baffle and the bottom of the evaporator are insufficient to carry any appreciable quantity of heat away from this area at or adjacent the top of the baffle.

The baffle 25 (Fig. 1) is slidably mounted on a pair of channel members 77, 78 secured at each side of the baffle to the inner liner 38. The receptacle 33 is slidably mounted on rails 79, 80 secured to the sides of the machinery compartment 36.

The general path of air flow during refrigeration is as follows (Fig. 2): Air passes over the top and under the bottom of the evaporator and toward the rear, then downwardly at the back and through a gap between the rear of the baffle and the inner liner, then generally forwardly to the inner liner of the main door and upwardly along and parallel to the door liner to the top front corner of the interior, as shown in said copending application of Oscar E. Norberg and Alfred E. Nave, Serial No. 119,432 filed October 4, 1949 and now Patent No. 2,562,057 of July 24, 1951.

The combined meat tray and drip receptacle 30 is suspended from and slidably mounted on L-shaped rails 81, 82 secured to the bottom of the baffle (Figs. 1, 8, 9).

From the foregoing it will be seen that the invention provides, in a refrigerator, the combination of an evaporator 20 defining an upper freezing compartment having a bottom wall and side walls, means (part of 38) for side and bottom bounding a lower food storage compartment 21, a defrosting device having a widely distributed heating element 22 mounted below and adjacent to said bottom wall, said heating element including two integral depending sections 23, 24 formed as spaced skid rails disposed in parallelism and projecting downwardly from said bottom wall, a baffle 25 for top-bounding said storage compartment 21, and means 77, 78 slidably horizontally mounting said baffle for insertion in or removal from said refrigerator, said baffle being formed to collect the moisture defrosted from said evaporator, said baffle having an integral metallic-heat-conductive top panel 56 formed with spaced projections 57, 58 having grooves 26, 27 complementary to and thermally engaging said skid rails, whereby heat is transferred from said element to said baffle to prevent freezing of moisture on said baffle, and means for discharging moisture from the baffle.

The means for discharging the water from the upper baffle surface and finally disposing of it comprises a pair of openings 28 and 29 (Fig. 4) through baffle 25. When the baffle 25 and the receptacle 30 are in their normal operating positions, the opening 29 is in registry with the rear interior of the receptacle, so that it can discharge moisture thereinto. When the housewife desires to employ manual methods of defrosting, she removes a plug, such as that indicated at 85 in Fig. 5 from opening 29 and places it in opening 28. When the manual defrosting operation is completed, then the receptacle 30 is slidably retracted from the cabinet and the water is disposed of. On the other hand, when automatic defrosting is desired, the plug 85 is placed in the opening 29 and the moisture deflected by the baffle is then discharged through the opening 28 into a drain spout 31, generally shown in Fig. 3 and shown in detail in Figs. 11 and 12. The drain spout comprises a downwardly inclined pipe 87 projecting through the inner liner 38 outwardly to the region of the outer shell 37. This pipe terminates at its outer end in an elbow 88 suitably flanged and secured to the outer shell. Grommet 89 assures an airtight seal between pipe 87 and the inner liner. The inner end of the pipe is flared in a funnel-like manner at 90, and the flared element may be either integral with the pipe 87 or separate as shown. Water discharged from opening 28 flows through the funnel-like member 90, in registry with the opening 28, and then diagonally downwardly through the pipe 87 and then downwardly through the elbow 88 to the exterior piping 32, which piping includes an elbow 92 and a discharge pipe 93 discharging into the water container 33, the water being conveyed downwardly and rearwardly from the spout 31, exteriorly and behind the shell, and finally forwardly to the water disposal container 33. This container is exposed to the heat of the condenser 35 and compressor 34, and the circulating air currents in the machinery compartment are of such temperature and volume and the tray is of such a capacity that all water is disposed of by evaporation between automatic defrosting operations.

While I do not desire to be limited to the specific parameters, dimensions, and components hereinbelow enumerated, the following have been found to be entirely satisfactory in one successful refrigerator incorporating the present invention and also incorporating a defrosting device in accordance wtih the aforementioned copending patent application of Benjamin D. Thomas:

A. *Refrigeration system.*—of domestic construction combining compressor, condenser, capillary tube restrictor, and evaporator interconnected into a hermetic system.

1. *Compressor.*—⅙ and ⅛ H. P. reciprocating type.
2. *Evaporator.*—horizontal frozen food type constructed of 13" x 22" refrigerated top and bottom plates joined into a box section with 8" aluminum back and side panels, the whole comprising approximately 1½ cu. ft. of volume and 6½ square ft. of external surface area (not including, of course, the insulated evaporator door surface).
3. *Condenser, restrictor, etc.*—conventional and of such design as to give efficient operation with the above evaporator at 0 degree to 10 degrees F. in domestic usage at normal control setting.

B. *Cabinet.*—9 cu. ft. and 11 cu. ft. sizes of conventional domestic construction embodying an outer shell, an inner liner, a breaker trim, a door outer shell, a door inner liner, and with approximately 3½ inches of conventional insulation.

C. *Temperature baffle.*—Insulated construction consisting of plastic shell with aluminum top surface and of such size as to largely separate the refrigerator interior into a low temperature section and a normal temperature section when disposed immediately beneath the evaporator. In addition, the top surface is formed to collect the defrost water and drain to a suitable container, and is also formed to provide surfaces to contact appropriately designed sections of the bottom evaporator plate heater.

D. *Defrost heaters.*—Approximately ¼ inch outside diameter tubular heaters of conventional resistance wire, refractory oxide, metallic sheath construction.

1. *Top evaporator plate heater.*—approximately 300 watts (approximately 105 inches long).
2. *Bottom evaporator plate heater.*—approximately 500 watts (approximately 130 inches long—this includes the baffle heating lengths totaling approximately 20 inches in length).

From the foregoing it will be seen that there has been provided an effective system for disposing of refrigerator defrost products without the annoyance of ice formation on the baffle and other portions of the disposal system.

While there has been shown and described what is at present believed to be the preferred embodiment of the invention, it will be obvious to those skilled in the art that various modifications and substitutions of equivalents may be made therein without departing from the true scope of the invention as defined by the claims appended hereto.

I claim:

1. In a refrigerator the combination of an evaporator, a removable baffle and moisture collecting member having a heat-conductive top cover, a defroster heating element mounted beneath said evaporator, said cover having an upwardly projecting portion in thermal engagement with said heating element, and means for slidably mounting said member below said element.

2. In combination in a domestic refrigerator an evaporator, a moisture collecting member having a heat-conductive top cover, a defroster heating element mounted beneath said evaporator, and means for heating said member while defrosting said evaporator comprising a portion of said heating element and integral projections on said cover, said portion comprising a plurality of spaced depending runners and said projections being formed with a like plurality of surfaces in contact with and complementary to said runners.

3. The combination in accordance with claim 2 wherein said heating element is tubular in section and sinuous in outline, said runners comprising integral runs of said element transverse to the front of said refrigerator.

4. The combination in accordance with claim 3 wherein said runs and surfaces slope downwardly and toward the rear of said evaporator and upwardly and toward the front thereof, and means for slidably mounting said moisture collecting member below said element, said slopes permitting quick release of said projections from frictional engagement with said runners when said collecting member is slid forwardly toward the user.

5. In a refrigerator the combination of a horizontally disposed evaporator defining an upper freezing compartment having a bottom wall and side walls, means for side and bottom-bounding a lower food storage compartment, a defrosting device having a serpentine heating element mounted below and adjacent to said bottom wall, said heating element including two integral depending sections formed as spaced skid rails disposed in parallelism to said side walls and projecting downwardly from said bottom wall, a baffle member for top-bounding said storage compartment and means slidably horizontally mounting said baffle for insertion in or removal from said refrigerator, said baffle being formed to collect the moisture defrosted from said evaporator, said baffle having an integral metallic heat-conductive top member formed with spaced projections having grooves complementary to and frictionally engaging said skid rails, whereby heat is transferred from said element to said baffle to prevent freezing of moisture on said baffle, and means including at least one discharge opening in said baffle for exhausting said moisture.

6. In a refrigerator having an inner liner and outer shell and insulation therebetween, the combination according to claim 5 wherein the last-mentioned means also includes a discharge spout projecting through said liner, insulation and shell for conveying moisture from the region of said opening to the exterior of said shell.

7. In a defrost products disposal system for a refrigerator having walls, the combination of a moisture collecting baffle, said baffle being formed with sloping surfaces directing water toward a discharge zone, said baffle having a pair of discharge openings in said zone, a container slidably mounted below and on the baffle and having an interior portion in communication with only one of said openings and a drain pipe in registry only with the other of said openings and extending through the wall to the exterior of the refrigerator.

8. The combination in accordance with claim 7 in which said baffle comprises a plastic bottom member and a metallic top panel.

9. The combination in accordance with claim 7 wherein said baffle is formed with a peripheral trough, both branches of which gradually slope from a high point forwardly and centrally of the baffle toward said discharge zone.

10. In combination, an evaporator, a removable baffle member and means for mounting it below said evaporator, an evaporator-defrosting device including means for preventing freezing of defrost products deposited on said baffle member comprising horizontally disposed serpentine electrical heat-generating means between said evaporator and said baffle, and means for mounting said generating means on said evaporator alone, said generating means and baffle being formed with frictionally engaging surfaces inclined at an acute angle from the horizontal plane.

11. In a refrigerator, the combination of an evaporator, a removable baffle and moisture collecting member positioned beneath said evaporator, a defroster heating element mounted on said evaporator, at least a portion of said heating element being positioned beneath said evaporator, said heating element portion being positioned above and substantially coextensive with said removable baffle member and in intimate heat exchange relationship therewith at multiple spaced points to heat substantially the entire surface of said removable baffle member, and means for removably mounting said baffle member directly beneath said heating element.

JOHN E. COCHRAN.

REFERENCES CITED

The following references are of record in the file of this patent:

UNITED STATES PATENTS

| Number | Name | Date |
|---|---|---|
| 2,167,442 | Alsing | July 25, 1939 |
| 2,315,222 | Philipp | Mar. 30, 1943 |
| 2,375,851 | Kalischer | May 15, 1945 |
| 2,492,397 | Peterson | Dec. 27, 1949 |
| 2,509,613 | Philipp | May 30, 1950 |
| 2,510,758 | Rundell | June 6, 1950 |
| 2,511,419 | Smith | June 13, 1950 |
| 2,513,823 | Shreve | July 4, 1950 |
| 2,526,032 | La Porte | Oct. 17, 1950 |